(12) United States Patent
Weissman et al.

(10) Patent No.: US 11,539,499 B2
(45) Date of Patent: Dec. 27, 2022

(54) HYBRID IN-BAND SAME FREQUENCY FULL-DUPLEX AND OFFSET-FREQUENCY FULL-DUPLEX WIRELESS COMMUNICATION

(71) Applicant: QUALCOMM INCORPORATED, San Diego, CA (US)

(72) Inventors: Haim Mendel Weissman, Haifa (IL); Assaf Touboul, Netanya (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 16/658,850

(22) Filed: Oct. 21, 2019

(65) Prior Publication Data

US 2020/0153598 A1   May 14, 2020

Related U.S. Application Data

(60) Provisional application No. 62/758,347, filed on Nov. 9, 2018.

(51) Int. Cl.
*H04L 5/14* (2006.01)
*H04L 5/00* (2006.01)

(52) U.S. Cl.
CPC .......... *H04L 5/1423* (2013.01); *H04L 5/0039* (2013.01); *H04L 5/0092* (2013.01); *H04L 5/1461* (2013.01)

(58) Field of Classification Search
None
See application file for complete search history.

(56) References Cited

U.S. PATENT DOCUMENTS

| | | | |
|---|---|---|---|
| 9,503,249 B2 | 11/2016 | Tetzlaff et al. | |
| 10,218,458 B2 | 2/2019 | Stirling-Gallacher et al. | |
| 10,257,792 B2 | 4/2019 | Fodor et al. | |
| 10,298,306 B2 | 5/2019 | Shimezawa et al. | |
| 2010/0105390 A1 | 4/2010 | Ishii | |
| 2011/0009142 A1* | 1/2011 | Higuchi | H04W 72/085 455/509 |

(Continued)

OTHER PUBLICATIONS

International Search Report and Written Opinion—PCT/US2019/057360—ISA/EPO—dated Jan. 29, 2020.

(Continued)

*Primary Examiner* — The Hy Nguyen
(74) *Attorney, Agent, or Firm* — Haynes and Boone LLP

(57) ABSTRACT

Wireless communications systems and methods related to hybrid in-band same-frequency full-duplex (SFFD) and frequency-offset-frequency full-duplex (FD) wireless communication are provided. A user equipment (UE) transmits first data to a base station (BS) over a first frequency band while receiving second data from the BS the first frequency band responsive to a first pathloss between the UE and the BS satisfying a threshold for an SFFD operation. The UE transmits third data to the BS over a second frequency band while receiving fourth data from the BS over a third frequency band that is distinct from the second frequency band according to an offset-frequency FD operation responsive to a second pathloss between the UE and the BS failing to satisfying the threshold.

26 Claims, 10 Drawing Sheets

(56) References Cited

U.S. PATENT DOCUMENTS

| | | | |
|---|---|---|---|
| 2013/0021954 A1* | 1/2013 | Montojo | H04W 72/10 370/295 |
| 2013/0089048 A1* | 4/2013 | Damnjanovic | H04L 5/0053 370/329 |
| 2013/0128782 A1* | 5/2013 | Boixadera | H04L 5/16 370/281 |
| 2013/0223294 A1 | 8/2013 | Karjalainen et al. | |
| 2014/0118083 A1* | 5/2014 | Shastry | H03H 11/344 333/129 |
| 2015/0118980 A1* | 4/2015 | Leung | H04B 1/38 455/114.2 |
| 2015/0229461 A1* | 8/2015 | DiFazio | H04L 5/14 370/280 |
| 2015/0382375 A1 | 12/2015 | Bhushan et al. | |
| 2016/0330011 A1* | 11/2016 | Lee | H04L 5/006 |
| 2017/0163403 A1 | 6/2017 | Karjalainen et al. | |
| 2017/0163404 A1* | 6/2017 | Liu | H04W 72/0413 |
| 2017/0346616 A1* | 11/2017 | Liu | H04L 5/0005 |
| 2018/0295020 A1* | 10/2018 | Mo | H04L 5/0037 |
| 2021/0067992 A1* | 3/2021 | Kusashima | H04L 5/0053 |
| 2021/0281293 A1* | 9/2021 | Takeda | H04B 5/02 |

OTHER PUBLICATIONS

Sabharwal A., et al., "In-Band Full-Duplex Wireless, Challenges and Opportunities", IEEE Journal on Selected Areas in Communications, vol. 32, No. 9, Sep. 2014 (Sep. 2014), XP055580962, pp. 1637-1652, IEEE USA USSN, 0733-8716, DOI, 10.1109/JSAC, 2014, 2330193, the whole document Section I.

* cited by examiner

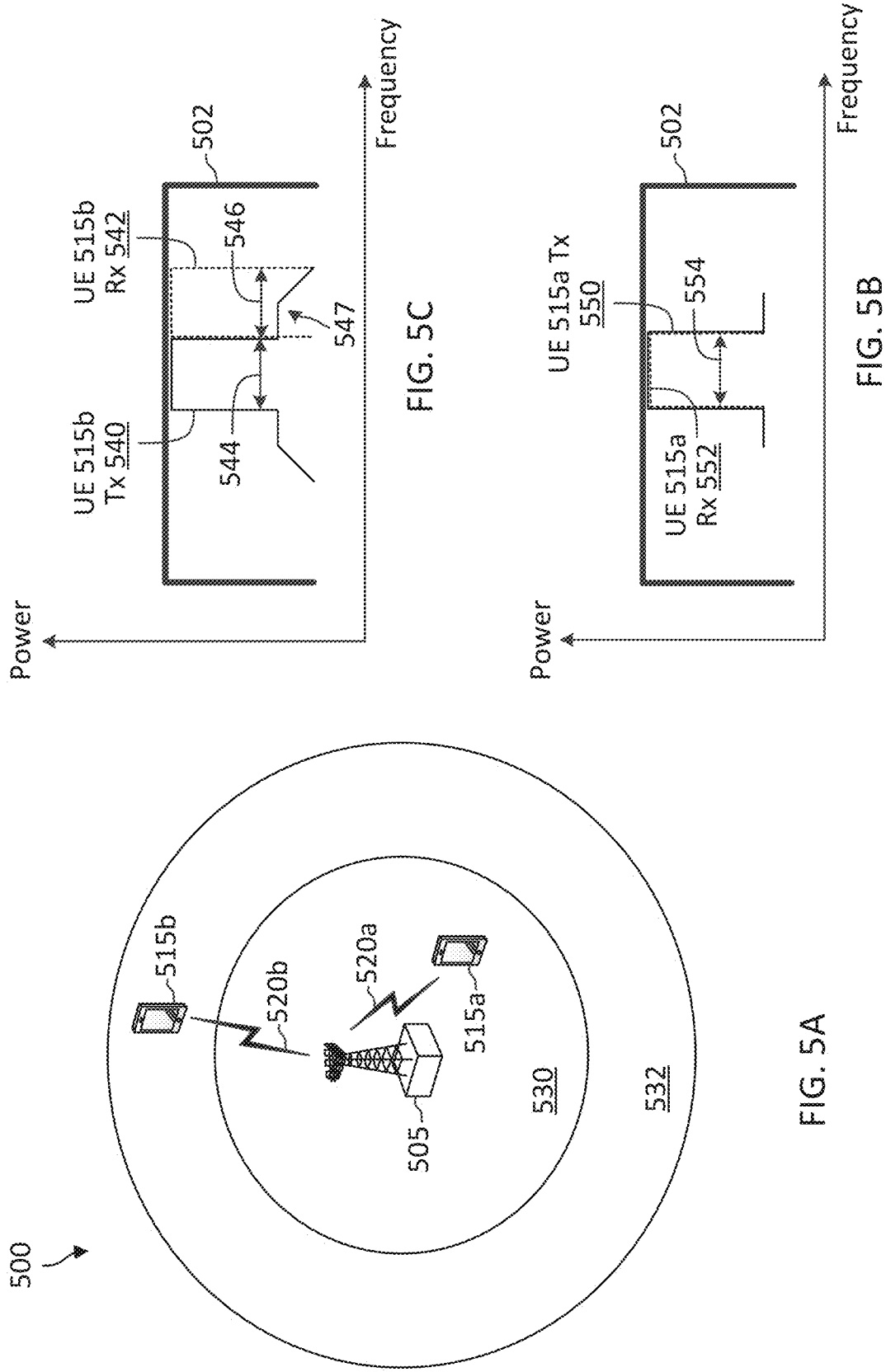

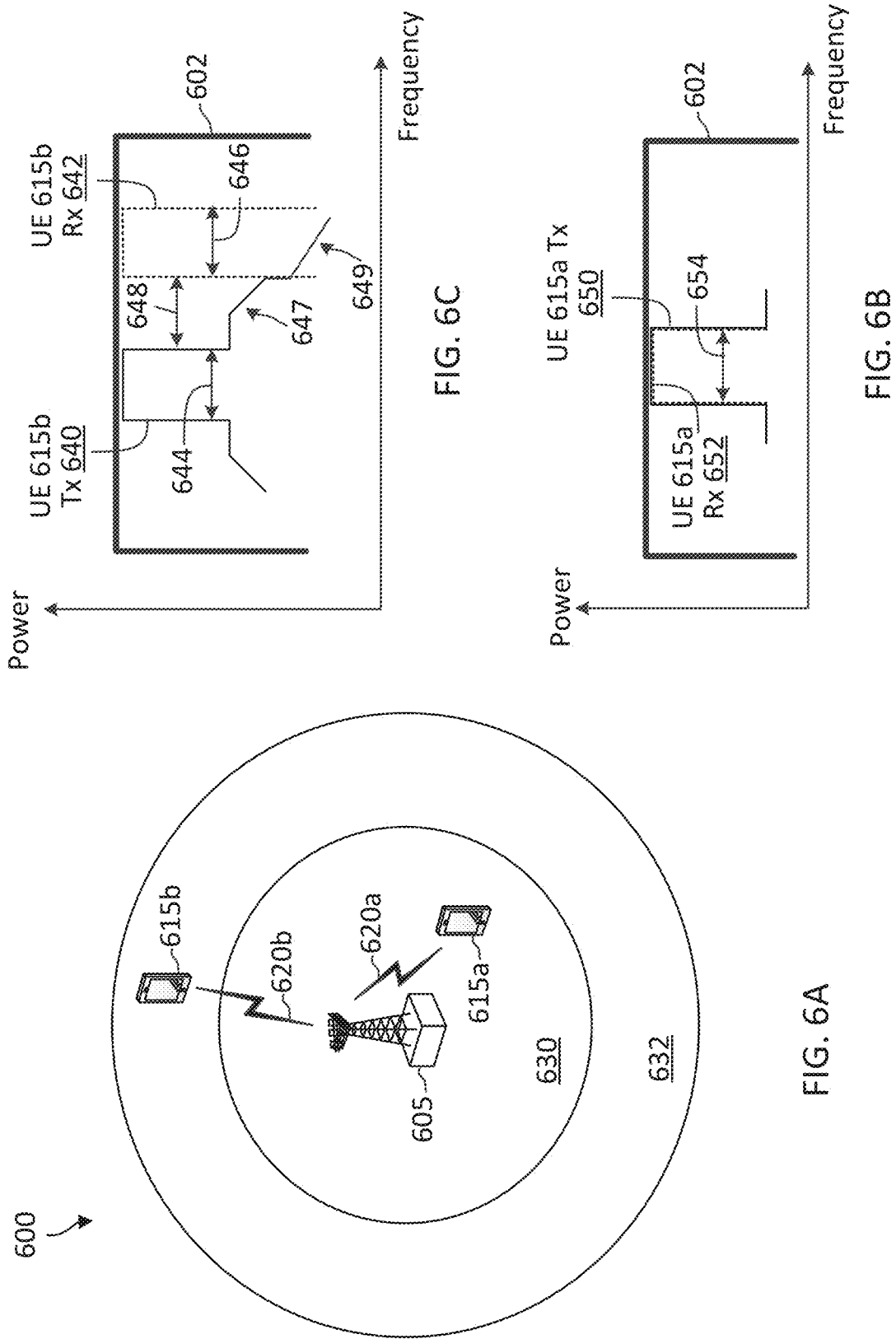

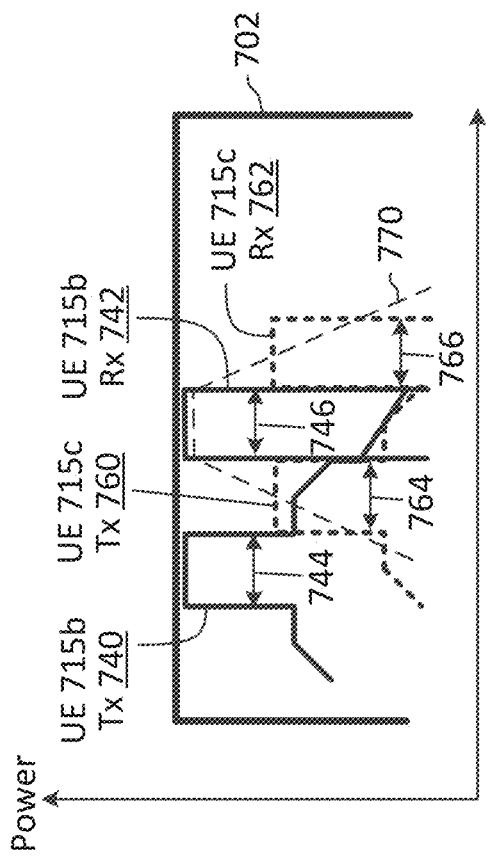
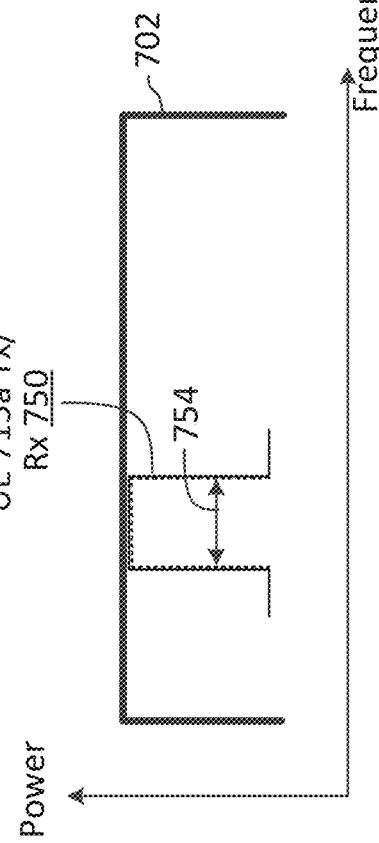
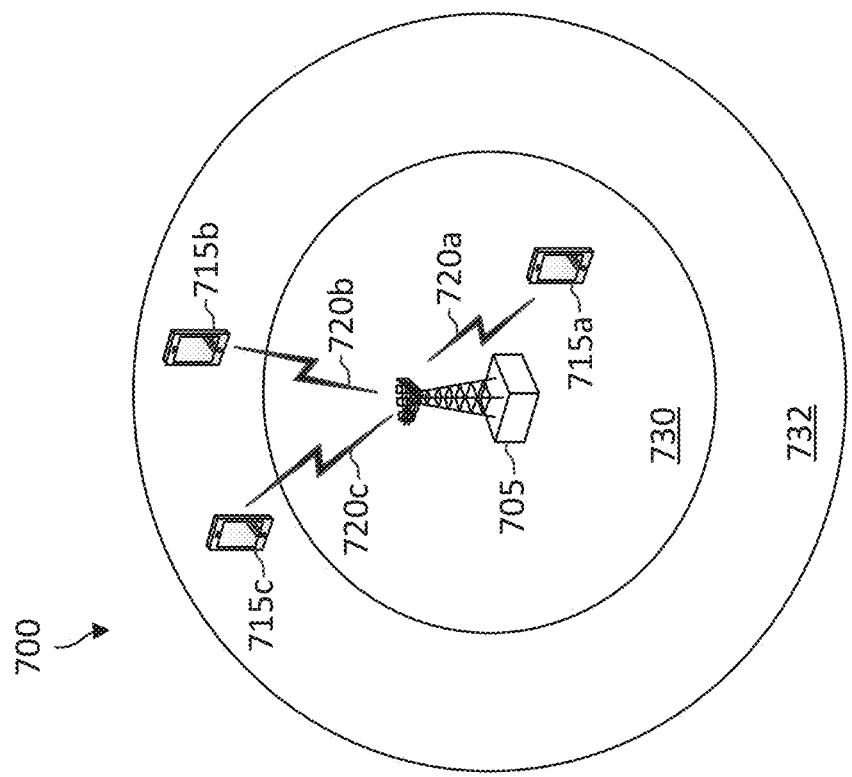
FIG. 7C
FIG. 7B
FIG. 7A

HYBRID IN-BAND SAME FREQUENCY FULL-DUPLEX AND OFFSET-FREQUENCY FULL-DUPLEX WIRELESS COMMUNICATION

CROSS REFERENCE TO RELATED APPLICATIONS

The present application claims priority to and the benefit of U.S. Provisional Patent Application No. 62/758,347, filed Nov. 9, 2018, which is hereby incorporated by reference in its entirety as if fully set forth below and for all applicable purposes.

TECHNICAL FIELD

This application relates to in-band full-duplex wireless communication and more particularly to hybrid same-frequency full-duplex (SFFD) and offset-frequency full-duplex (FD) wireless communication. SFFD refers to the use of the same frequency band for uplink and downlink transmission. Offset-frequency FD refers to the use of separate uplink and downlink frequency bands that are offset from each for uplink transmission and downlink transmission, respectively. Certain embodiments enable and provide solutions and techniques to improve communication between a base station (BS) and a cell-edge user equipment (UE).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

Since the wireless spectrum is not unlimited, users must limit their transmissions to regulated bandwidths. This bandwidth regulation also limits the achievable data rates because data rates are generally proportional to bandwidth as governed by Shannon's law. Despite these bandwidth limitations, modern communication standards are demanding ever greater data rates. For example, the fifth generation (5G) wireless standard provides for data rates of up to 20 gigabits per second. To achieve such high data rates requires network users to efficiently use their available bandwidth. One way to enhance bandwidth usage is SFFD operation in which a transceiver transmits and receives data simultaneously over the same frequency band. But such in-band SFFD operation raises significant issues of self-interference. A cellular handset can only separate its transmitting and receiving antennas by a relatively short distance, so the transmitted signal may couple strongly into the received signal.

The self-interference for the received signal is inversely proportional to the separation in the operating wavelength between the transmitting and receiving antennas. In conventional communications standards such as the third generation (3G), the licensed frequency bands were relatively low in frequency such that the separation in wavelengths is relatively small. But the licensed bands in the 5G standard include higher frequencies such that the antenna as measured by wavelengths is more pronounced. In addition, the antennas themselves are more compact for such higher frequencies such that a cellular handset can employ a transmitting array of antennas as well as a receiving array of antennas. This use of antennas arrays enables the handset (user equipment) to employ beamforming techniques that further limit the self-interference problem. The increased attenuation between the transmitting and receiving antennas and additional suppression through beamforming combined with analog and digital self-interference cancellation techniques makes the bandwidth efficiency of in-band SFFD operation an attractive option for 5G systems. But the implementation of in-band SFFD operation remains very challenging since it requires the handset to have approximately 110 decibels (dB) of isolation between the receiving and transmitting signal paths. As the isolation worsens, the self-leakage causes receiver de-sense that swamps the received signal.

One obstacle in realizing in-band SFFD operation is the size of the cell for each 5G base station. The pathloss at the higher 5G frequencies are significant such that power amplifier in the handset and in the base station needs to operate at a relatively high power as the handset moves to the periphery of the cell. Such high-power operation introduces distortion that increases the effective error vector magnitude (EVM) at the receiver even when a transmit signal at the receiver is sufficiently rejected. The resulting noise causes in-band SFFD operation problematic for 5G implementation. Such distortion could be reduced by decreasing the cell size. But such a decrease in cell size would be prohibitively expensive since it would require an inordinate number of base stations. Accordingly, there is a need in the art for improved in-band SFFD systems.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of the present disclosure provide mechanisms for enabling in-band full-duplex operation without requiring excessively small cell size by segregating users in each cell into either an SFFD class or an offset-frequency FD class based upon pathlosses between the users and a serving base station (which is equivalent to segregating the users according to their power amplification levels). Users having relatively-low pathlosses are placed in the SFFD class, where each SFFD user's transmitter and receiver are allocated with the same frequency band within an allocated carrier-bandwidth. In other words, each SFFD user's transmitter and receiver are allocated with the same group of resource blocks within the allocated carrier-bandwidth. In contrast, users having relatively-high pathlosses are placed in the offset-frequency FD class, where each offset-frequency FD user's transmitter and receiver are allocated with dedicated receive and transmit frequency bands that are offset from each other but still within the allocated carrier-bandwidth. In other words, each offset-frequency FD user's transmitter and receiver are each allocated with a dedicated group of resource blocks within the carrier-bandwidth, where the allocated receive resource blocks and the allocated transmit resource blocks are offset from each other. Therefore, offset-frequency FD also operates in-band (within the allocated carrier-bandwidth) and in full-duplex as SFFD. The resulting access scheme may be designated as "hybrid" since it is a combination of both SFFD and offset-frequency FD operation, falling within the allocated carrier-bandwidth and supporting full-duplex operation.

For example, in an aspect of the disclosure, a method for a user equipment (UE), including responsive to a first pathloss between the UE and a base station (BS) satisfying a threshold for an SFFD operation, transmitting first data from the UE to the BS over a first frequency band while receiving second data from the BS at the UE over the first frequency band. The method also includes responsive to a second pathloss between the UE and the BS failing to satisfy the threshold, transmitting third data from the UE to the BS over a second frequency band while receiving fourth data from the BS at the UE over a third frequency band that is distinct from the second frequency band according to an offset-frequency FD operation.

In an additional aspect of the disclosure, a method for a base station (BS), including responsive to a first pathloss between the BS and a first user equipment (UE) satisfying a threshold for an SFFD operation, transmitting first data from the BS to the first UE over a first frequency band while receiving second data from the first UE at the BS over the first frequency band. The method also includes responsive to a second pathloss between the BS and a second UE failing to satisfy the threshold, transmitting third data from the BS to the second UE over a second frequency band while receiving fourth data from the second UE at the BS over a third frequency band that is distinct from the second frequency band according to an offset-frequency FD operation.

In an additional aspect of the disclosure, a user equipment (UE) including a transceiver configured to responsive to a first pathloss between the UE and a base station (BS) satisfying a threshold for an SFFD operation, transmit first data to the BS over a first frequency band while receiving second data from the BS over the first frequency band. The transceiver is also configured to responsive to a second pathloss between the UE and the BS failing to satisfy the threshold, transmit third data to the BS over a second frequency band while receiving fourth data from the BS over a third frequency band that is distinct from the second frequency band according to an offset-frequency FD operation.

In an additional aspect of the disclosure, a base station (BS) including a transceiver configured to responsive to a first pathloss between the BS and a first user equipment (UE) satisfying a threshold for an SFFD operation, transmitting first data to the first UE over a first frequency band while receiving second data from the first UE over the first frequency band. The transceiver is also configured to responsive to a second pathloss between the BS and a second UE failing to satisfy the threshold, transmitting third data to the second UE over a second frequency band while receiving fourth data from the second UE over a third frequency band that is distinct from the second frequency band according to an offset-frequency FD operation.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 5A illustrates a hybrid cell having users segregated into a central SFFD portion and an outer offset-frequency full-duplex portion according to some aspects of the present disclosure.

FIG. 5B illustrates a transmit/receive frequency band allocation for an SFFD user according to some aspects of the present disclosure.

FIG. 5C illustrates a transmit/receive frequency band allocation for an offset-frequency full-duplex (FD) user according to some aspects of the present disclosure.

FIG. 6A illustrates a hybrid cell having users segregated into a central SFFD portion and an outer offset-frequency FD portion according to some aspects of the present disclosure.

FIG. 6B illustrates a transmit/receive frequency band allocation for an SFFD user according to some aspects of the present disclosure.

FIG. 6C illustrates a transmit/receive frequency band allocation for an offset-frequency FD user according to some aspects of the present disclosure.

FIG. 7A illustrates a hybrid cell having users segregated into a central SFFD portion and an outer offset-frequency FD portion according to some aspects of the present disclosure.

FIG. 7B illustrates a transmit/receive frequency band allocation for an SFFD user according to some aspects of the present disclosure.

FIG. 7C illustrates a transmit/receive frequency band allocation for an offset-frequency FD user according to some aspects of the present disclosure.

DETAILED DESCRIPTION

Figure 1:
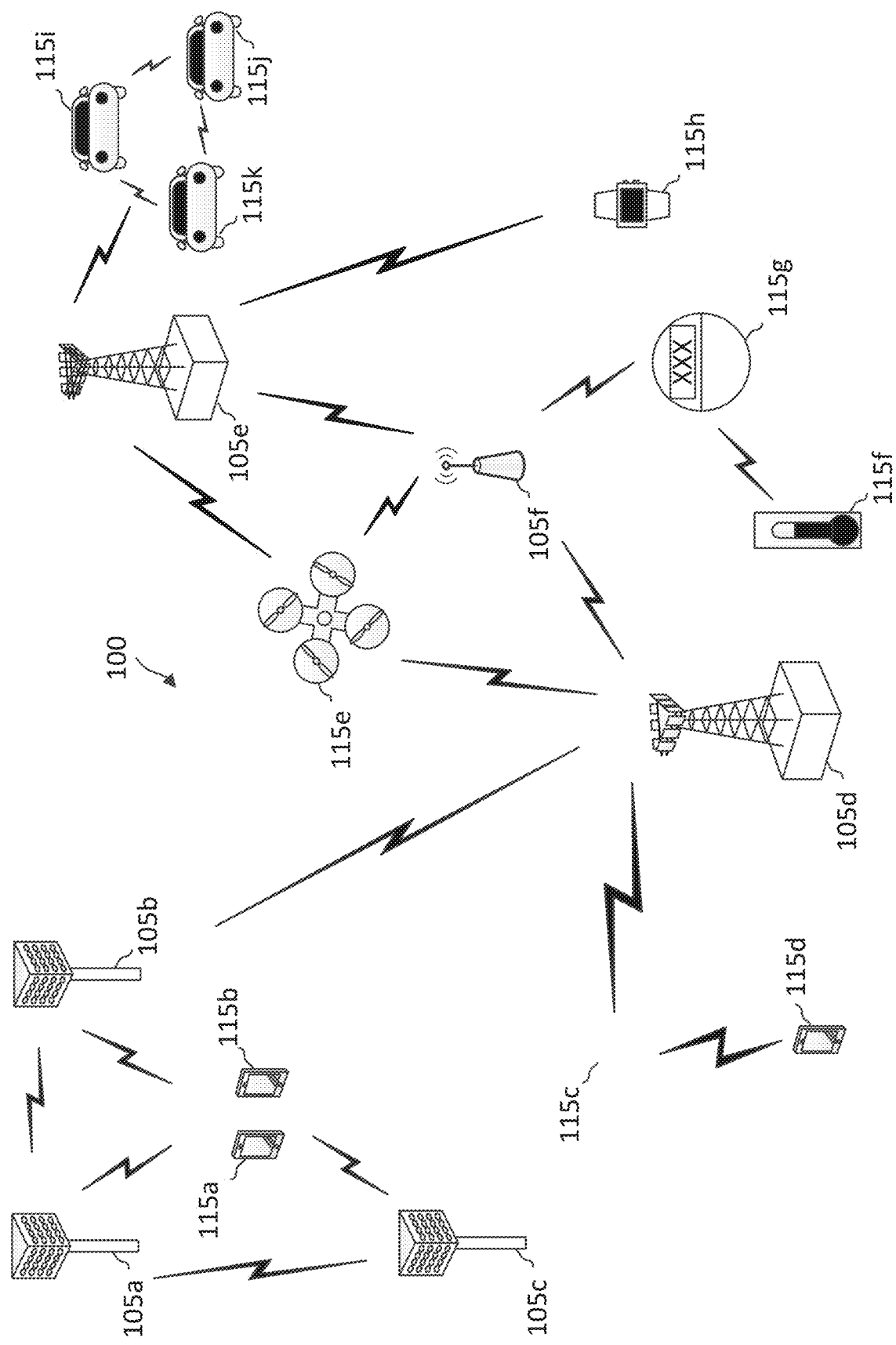
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In-band same-frequency full-duplex (SFFD) has double the capacity gain over half-duplex. However, as discussed above, SFFD can be challenging since it requires isolation in the order of about 110 decibel (dB) between a transmit signal path and a receive signal path. The current market solutions may allow SFFD operation at a limited coverage range. Thus, user equipment devices (UEs) located at a central region of a cell close to a serving base station (BS) may communicate with the BS using SFFD, whereas UEs located a cell edge or a periphery of the cell may not use SFFD for communication with the BS.

The present application describes mechanisms for enabling UEs in a cell to participate in full-duplex communication with a BS serving the cell irrespective of where the UEs are located within the cell. For example, a BS may select between an SFFD mode and an offset-frequency full-duplex (FD) mode for communication with a UE based on a pathloss between the BS and the UE. An SFFD UE may be allocated with a single, same frequency band within an allocated carrier-bandwidth (up to the entire allocated carrier-bandwidth) for simultaneous uplink (UL) transmission and downlink (DL) reception. In other words, the SFFD UE may be allocated with the same group of resource blocks for within the allocated carrier bandwidth for simultaneous UL transmission and DL reception. An offset-frequency FD UE may be allocated with separate, dedicated transmit and receive frequency bands that are offset from each other within the carrier-bandwidth for simultaneous UL transmission and DL reception. In other words, the offset-frequency FD UE may be allocated with a dedicated group of resource blocks within the carrier-bandwidth for transmission and another dedicated group of resource blocks within the carrier-bandwidth for reception, where the group of transmit resource blocks are offset from the group of receive resource blocks. The present disclosure may use the term "transmit resource blocks" or "transmit frequency band" to refer to an UL transmit allocation and may use the term "receive resource blocks" or "receive frequency band" to refer to a DL receive allocation.

The BS may assign an SFFD mode to a UE with a relatively small pathloss between the BS and the UE, for example, when the pathloss is lower than a certain threshold. The BS may assign an offset-frequency FD mode to a UE with a relatively high pathloss between the BS and the UE, for example, when the pathloss is greater than a certain threshold. In some instances, the BS may serve the same data rate to UEs across a cell irrespective of whether the UE is configured for SFFD or offset-frequency FD communication. For instance, the BS may allocate a single 100 MHz frequency band to an SFFD UE for simultaneous UL transmission and DL reception and may allocate a 100 MHz UL transmit band and a separate 100 MHz DL receive band for an offset-frequency FD UE. In some other instances, the BS may serve an SFFD UE with a higher data rate than an offset-frequency FD UE. For instance, the BS may allocate a single 400 MHz frequency band to an SFFD UE for simultaneous UL transmission and DL reception and may allocate a 100 MHz transmit band and a separate 100 MHz receive band to an offset-frequency FD UE for simultaneous UL transmission and DL reception.

For offset-frequency FD operation, the UL transmit band and the DL receive band can be adjacent bands contiguous in frequency. Alternatively, the UL transmit band and DL receive band may be offset or spaced apart from each other. In some instances, the offset between a UL transmit band and a DL receive band may be dependent on a pathloss or a distance between the BS and a corresponding UE. In some instances, the UL transmit band and the DL receive band for one UE may interleave with a UL transmit band or a DL receive band of another UE. In some instances, an offset-frequency FD UE may perform an offset transmit modulation in a transmit path to allow for a single local oscillator (LO) to be used with a zero intermediate frequency (IF) conversion in a receive path.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105O) and other network entities. A BS 105 may be a station that communicates with UEs 115 and may also be referred to as an eNB, a gNB, an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central region of a carrier or any suitable frequencies within the carrier.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI, OSI, and/or one or more system information blocks (SIBs). The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS. In some aspects, SIB1 may contain cell access parameters and scheduling information for other SIBs.

After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant. In some aspects, the BS 105 may communicate with a UE 115 using HARQ techniques to improve communication reliability, for example, to provide a URLLC service.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

To enable the UEs 115 in the network 100 to achieve the bandwidth efficiency of in-band FD operation, the pathloss between the BS 105 and each UE is estimated. The following description will assume that this estimation is made by a BS 105, but it may also be performed by each UE 115. In that regard, it is conventional for a BS 105 to estimate the pathloss, for example, such as through a signal-to-interference ratio (SIR) measurement and to command a UE 115 to transmit with a certain power amplification level accordingly. The power amplification level may thus be used as a proxy for the pathloss to segregate a UE 115 into either an SFFD class or an offset-frequency FD class. A UE 115 in the SFFD class functions using SFFD operation such that the UE 115's transmit frequency band is the same as the UE 115's receive frequency band. But UEs 115 in the offset-frequency FD class function using separate transmit and receive frequency bands. The offset-frequency FD class may thus also be denoted as a frequency division multiplexing (FDM) class.

In general, the UEs 115 operating in the periphery or the edge of a cell will need to employ a higher transmission power than the UEs 115 that are more centrally located or at a closer proximity to a BS 105. The range to the BS 105 may thus also be used as a proxy for the pathloss to segregate the UEs 115 into either the SFFD class or the offset-frequency FD class. But note that a centrally-located UE 115 may also be in a high-path-loss environment such as when a structure obscures the line-of-sight between the UE 115 and the BS 105. The distance between a UE 115 and the BS 105 may be one factor with regard to whether the UE 115 may function using SFFD or offset-frequency FD operation. Mechanisms for using SFFD and/or offset-frequency FD operation for communications between a BS 105 and a UE 115 are described in greater detail herein.

Figure 2:
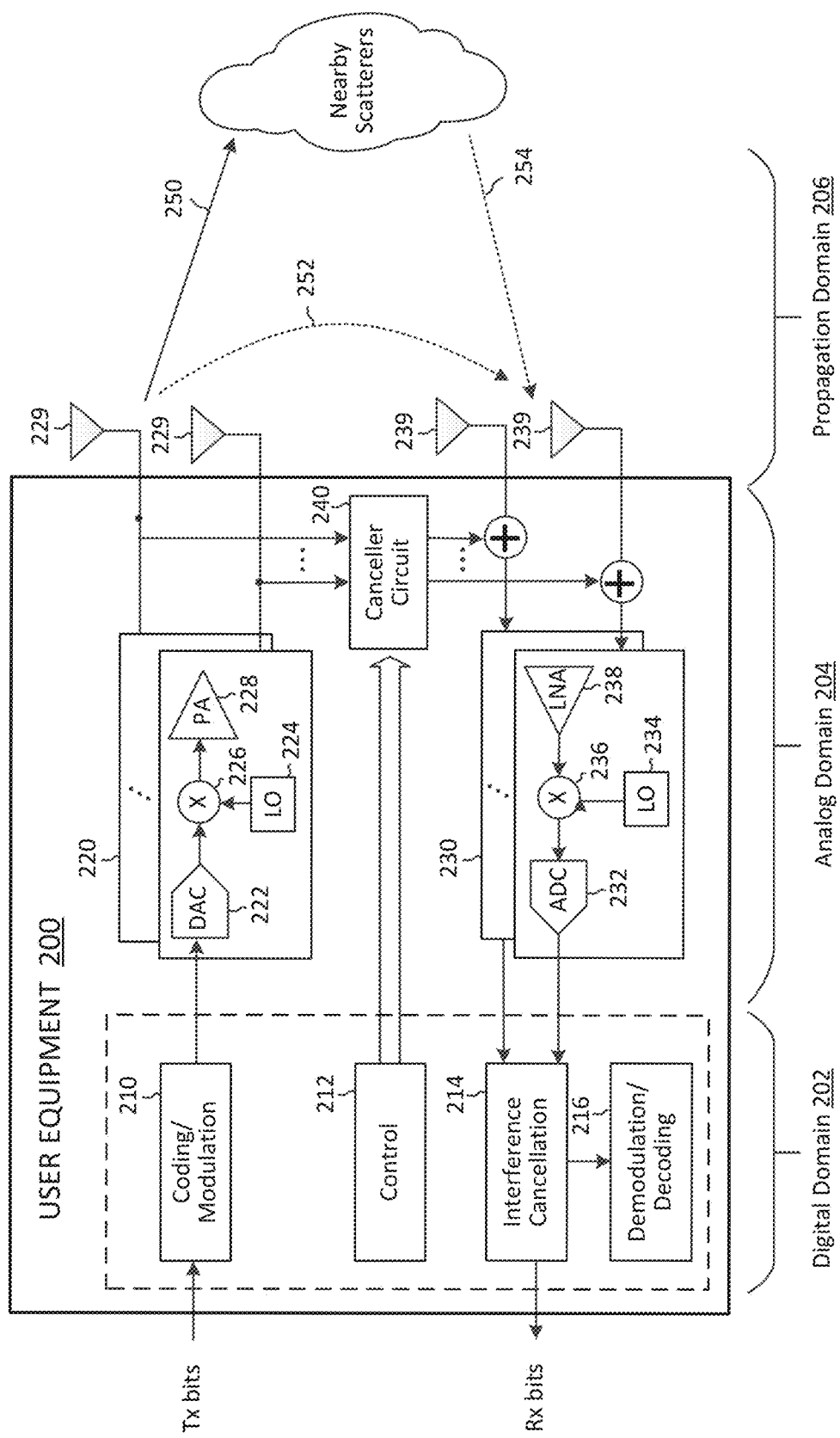
FIG. 2 illustrates transmit/receive paths of a user equipment (UE) operating in a same-frequency full-duplex (SFFD) mode according to some aspects of the present disclosure.

FIG. 2 illustrates transmit/receive paths of a UE 200 operating in an SFFD mode according to some aspects of the present disclosure. The UE 200 may correspond to a UE 115 in the network 100. For instance, the UE 200 may be located centrally or close to a serving BS similar to the BS 105. While FIG. 2 is described in the context of a UE, it will be appreciated that a BS may have analogous transmit and receive paths. FIG. 2 illustrates the transmit/receive paths of the UE 200 including a digital domain 202, an analog domain 204, and a propagation domain 206.

In the digital domain 202, the UE 200 may include a digital baseband portion (shown by the dashed box) including a coding/modulation component 210 in the transmit path, an interference cancellation component 214 and a demodulation/decoding component 216 in the receive path, and a control component 212. The coding/modulation component 210, the interference cancellation component 214, the demodulation/decoding component 216, the control component 212 may include hardware and/or software.

In the analog domain, the UE 200 may include a plurality of transmit chains 220 in the transmit path and a plurality of receive chains 230 in the receive path. Additionally, the transmit chains 220 are coupled to the receive chains 230 by a canceller circuit 240. The transmit chains 220 are coupled to the coding/modulation component 210. The receive chains 230 are coupled to the interference cancellation component 214 and the demodulation/decoding component 216. For instance, the UE 200 may include N integer number of transmit chains 220 and N integer number of receive chains 230. In some other instances, the UE 200 may include a greater number or a less number of transmit chains 220 than receive chains 230. Each transmit chain 220 may include a digital-to-analog converter (DAC) 222, a local oscillator (LO) 224, a mixer 226, and a power amplifier (PA) 228. Each receive chain 230 may include a low-noise amplifier (LNA) 238, a mixer 236, a LO 234, and an analog-to-digital converter (ADC) 232.

For transmission, transmit (Tx) bits are processed in the digital domain 202. In this regard, the transmit bits are coded and modulated by the coding/modulation component 210. The resulting coded and modulated digital signals output by the coding/modulation component 210 drive the plurality of transmit chains 220 coupled to an array of N transmitting antennas 229. Each transmit chain 220 passes through the analog domain 204 by being converted into analog form by the DAC 222 and then mixed with a LO 224 in a mixer 226 to produce an RF signal. The RF signal is amplified by the PA 228 (e.g., a high-power amplifier (HPA)) before driving the corresponding one of antennas 229 for transmission to a BS such as the BSs 105 along a transmission path 250.

The receive chains 230 are analogous in that each receive chain 230 is coupled to a receiving antenna 239. The resulting received RF signal passes through the analog domain 204 by being amplified by the LNA 238, mixed with an LO 234 in a mixer 236 and converted into a digital form by the ADC 232. The resulting digital received signals are demodulated and decoded by the demodulation/decoding component 216 in the digital domain 202 to form a stream of received bits.

As noted earlier, the isolation between the transmitted signal from transmitting antennas 229 and the desired received signal at receiving antennas 239 is to be substantially significant (e.g., approximately 110 decibel (dB)) to achieve a sufficient signal-to-noise ratio (SNR) in the receive path such that an acceptable or necessary bit error rate is obtained. A first step in satisfying this isolation is the physical separation between the transmitting antennas 229 and the receiving antennas 239, for example, based on the layout of the antennas 229 and 239 at the UE 200. In a typical UE or handset, this separation may be approximately 8 centimeters (cm). In the upper 5G frequency bands (e.g., at about 28 gigahertz (GHz)), such a separation provides approximately 55 dB of isolation over a direct transmission path 252. In addition, beamforming and/or beam steering can be applied to the antennas 229 and 239 to provide approximately another 10 dB of isolation.

To achieve the desired 110 dB of isolation, the UE 200 utilizes the interference cancellation component 214 to perform digital interference cancellation in the digital domain 202. For instance, the interference cancellation component 214 estimates the amount of interference in a received signal that is contributed by the transmit signal being coupled into the receive path. The interference cancellation component 214 may remove or reduce the interference from the received signal based on the estimation prior to demodulation and/or decoding. Additionally, the UE 200 utilizes the canceller circuit 240 in the analog domain 204 to provide analog interference cancellation. In some instances, the control component 212 can configure and/or control the canceller circuit 240 to provide the interference cancellation. This cancellation techniques further mitigate the interference from the direct transmission path 252 as well as reflections of the transmitted signal from nearby scatterers on reflected paths 254. The combination of the analog and digital cancellation techniques provides another 35 dB of isolation in low-path-loss operation so that the desired level of 110 dB of overall isolation is satisfied. In such low-path-loss operation, the power amplification levels used by the transmitters or transmit chains 220 does not introduce a significant amount of distortion so that robust self-cancellation may be achieved to enable SFFD operation. As used herein, a pathloss that is relatively small (e.g., below a certain threshold) is deemed to be sufficient for supporting SFFD operation.

However, in a high-path-loss environment such as in the cell periphery or cell edge, the analog and digital self-interference cancellation techniques lose their effectiveness due to the elevated power amplification levels introducing distortion in the transmitted signals. Such a pathloss (e.g., greater that a certain threshold) is deemed herein to be insufficient for supporting SFFD operation. The resulting non-linearities can reduce the 35 dB of isolation for the cancellation techniques by 10 dB to 15 dB such that the desired level of 110 dB of isolation is not satisfied.

Accordingly, the present disclosure provides techniques for switching a UE from SFFD operation (using the same, single frequency band for transmit and receive) to offset-frequency FD operation (using different frequency bands for transmit and receive) based on whether pathlosses between the UE and the BS is sufficient for SFFD or not. For instance, the BS may use a pathloss threshold and/or a distance threshold to switch a UE between the SFFD operation and the offset-frequency FD operation. Mechanisms for provisioning hybrid SFFD and offset-frequency FD in a cell are described in greater detail herein.

Figure 3:
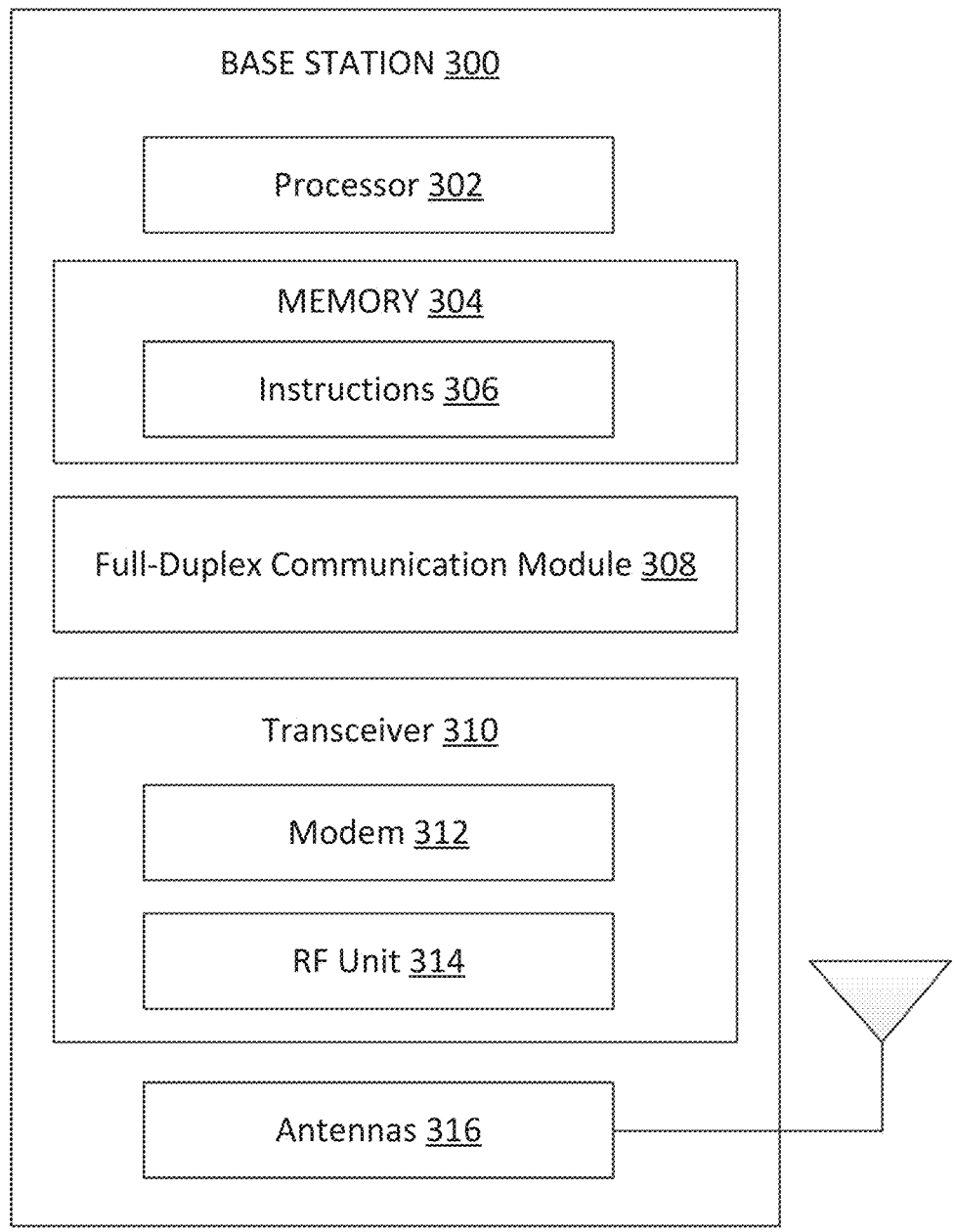
FIG. 3 is a block diagram of a UE according to some aspects of the present disclosure.

FIG. 3 is a block diagram of an exemplary BS 300 according to some aspects of the present disclosure. The BS 300 may be a BS 105 discussed above in FIG. 1. As shown, the BS 300 may include a processor 302, a memory 304, a FD communication module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with aspects of the present disclosure, for example, aspects of FIGS. 5-7 and 10. Instructions 306 may also be referred to as program code. The program code may be for causing a wireless communication device to perform these operations, for example by causing one or more processors (such as processor 302) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The FD communication module 308 may be implemented via hardware, software, or combinations thereof. For example, the FD communication module 308 may be implemented as a processor, circuit, and/or instructions 306 stored in the memory 404 and executed by the processor 302. In some instances, the FD communication module 308 can be integrated within the modem subsystem 312. For example, the FD communication module 308 can be implemented by a combination of software components (e.g., executed by a DSP or a general processor) and hardware components (e.g., logic gates and circuitry) within the modem subsystem 312.

The FD communication module 308 may be used for various aspects of the present disclosure, for example, aspects of FIGS. 5-7 and 10. The FD communication module 308 is configured to determine a pathloss for a UE (e.g., the UEs 115 and/or 200), select from an SFFD mode and an offset-frequency FD mode for communication with the UE based on the pathloss, allocate a same frequency band for the UE to transmit and receive if the SFFD is selected, allocate separate transmit and receive bands for the UE if offset-frequency FD is selected, determine a frequency offset or frequency spacing between the transmit and receive bands (e.g., based on the pathloss) if the offset-frequency FD is selected, and transmit an indication of a transmit-receive frequency band allocation to the UE based on the allocation. When SFFD is selected, the FD communication module 308 is configured to transmit data to the UE in a frequency band while receiving data from the UE in the same frequency band for the SFFD operation. When offset-frequency FD is selected, the FD communication module 308 is configured to transmit data to the UE in a second frequency band while receiving data from the UE in a third frequency band distinct from the second frequency band for the offset-frequency FD operation.

In some instances, the FD communication module 308 is configured to receive reference signals from the UE, transmit reference signals to the UE, estimate a pathloss or distance between the BS 300 and the UE based on received reference signals, report the pathloss or distance estimate, transmit a transmit power control command to the UE, configure the transceiver 310 based on the transmit power control command. In some instances, the FD communication module 308 is configured to perform interference cancellation, for example, by coordinating with the transceiver 310. Mechanisms for segregating UEs in a cell into an SFFD class and an offset-frequency FD class for full-duplex communications are described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, and/or the FD communication module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data (e.g., PDSCH, PDCCH, transmit-receive frequency band allocations, for SFFD and/or offset-frequency FD communications, reference signals for pathloss measurements, transmit power control commands) from the modem subsystem 312 (on outbound transmissions) or of transmissions originating from another source such as a UE 115. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The transceiver 310 may provide the demodulated and decoded data (e.g., PUCCH, PUSCH, reference signals for pathloss measurement) to the FD communication module 308 for processing. The antennas 316 may include multiple antennas of similar or different designs in order to sustain multiple transmission links. The RF unit 314 may configure the antennas 316.

In an aspect, the transceiver 310 is configured to transmit data to the UE over a first frequency band while receiving second data from the UE over the first frequency band responsive to a pathloss between the BS and the UE satisfying a threshold for an SFFD operation, for example, by coordinating with the FD communication module 308. In an aspect, the transceiver 310 is configured to transmit data to the UE over a second frequency band while receiving data from the UE over a third frequency band that is distinct from the second frequency band according to an offset-frequency FD operation, for example, by coordinating with the FD communication module 308.

In an aspect, the BS 300 can include multiple transceivers 310 implementing different RATs (e.g., NR and LTE). In an aspect, the BS 300 can include a single transceiver 310 implementing multiple RATs (e.g., NR and LTE). In an aspect, the transceiver 310 can include various components, where different combinations of components can implement different RATs.

Figure 4:
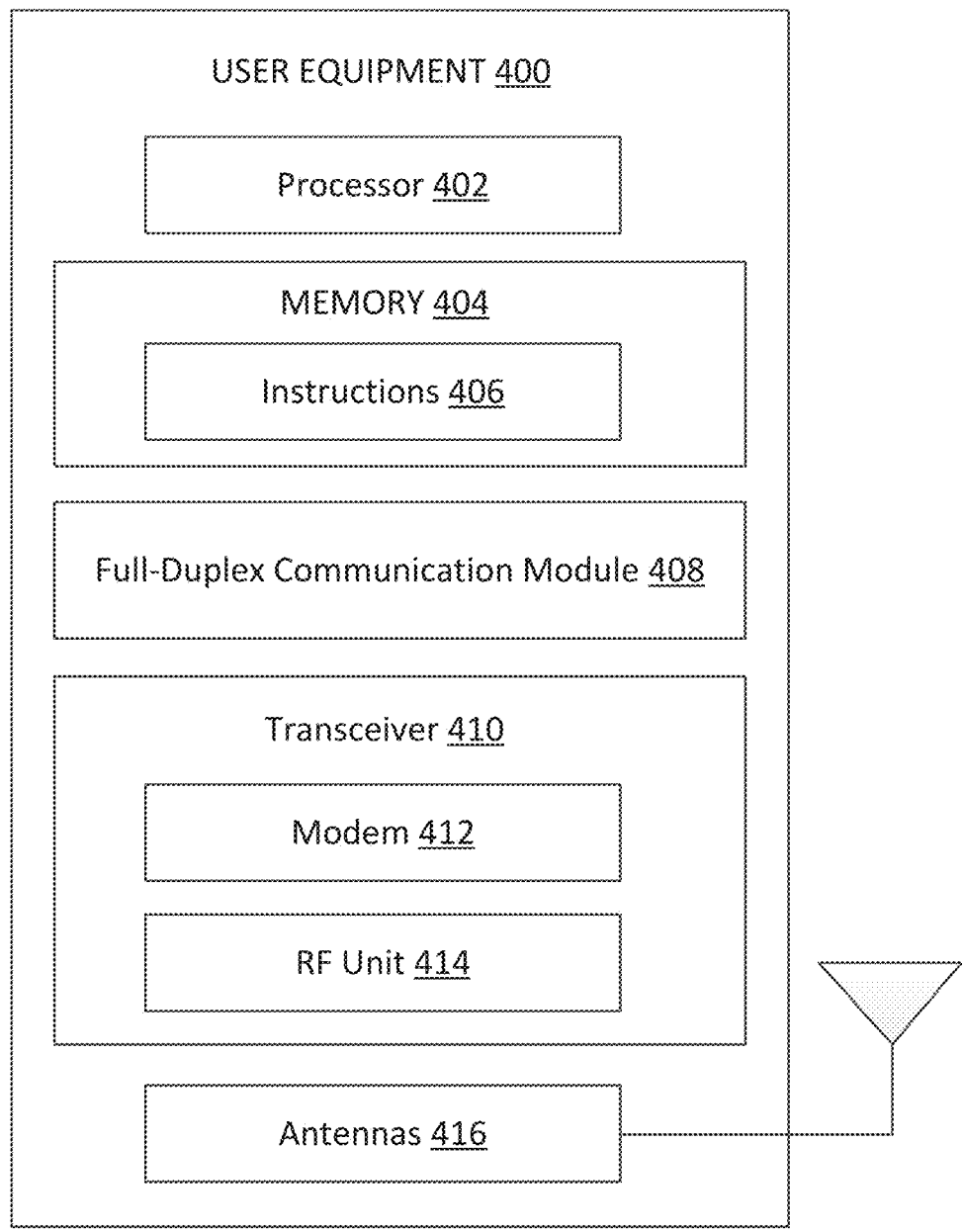
FIG. 4 is a block diagram of an exemplary base station (BS) according to some aspects of the present disclosure.

FIG. 4 is a block diagram of an exemplary UE 400 according to some aspects of the present disclosure. The UE 400 may be a UE 115 in the network 100 as discussed above in FIG. 1. A shown, the UE 400 may include a processor 402, a memory 404, a FD communication module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 2 and 5-9. Instructions 406 may also be referred to as code, which may be interpreted broadly to include any type of computer-readable statement(s) as discussed above with respect to FIG. 3.

The FD communication module 408 may be implemented via hardware, software, or combinations thereof. For example, the FD communication module 408 may be implemented as a processor, circuit, and/or instructions 406 stored in the memory 404 and executed by the processor 402. In some instances, the FD communication module 408 can be integrated within the modem subsystem 412. For example, the FD communication module 408 can be implemented by a combination of software components (e.g., executed by a DSP or a general processor) and hardware components (e.g., logic gates and circuitry) within the modem subsystem 412.

The FD communication module 408 may be used for various aspects of the present disclosure, for example, aspects of FIGS. 2 and 5-9. The FD communication module 408 is configured to receive a transmit-receive frequency band allocation from a BS (e.g., the BSs 105 and/or 300) and communicate with the BS based on the transmit-receive frequency band allocation. The transmit-receive frequency band allocation may be configured for SFFD or offset-frequency FD communication with the BS depending on a pathloss between the UE 400 and the BS. When the transmit-receive frequency band allocation indicates a single, same first frequency band for SFFD, the FD communication module 408 is configured to transmit data to the BS in the first frequency band while receiving data from the BS in the same first frequency band for the SFFD operation. When the transmit-receive frequency band allocation indicates a second frequency band and a separate third frequency band for offset-frequency FD, the FD communication module 408 is configured to transmit data to the BS in the second frequency band while receiving data from the UE in the third frequency band for the offset-frequency FD operation. In some instances, the second frequency band and the third frequency band are adjacent frequency bands. In some instances, the second frequency band and the third frequency band are spaced apart from each other by a guard band or a frequency separation. In some instances, the frequency separation between the second frequency band and the third frequency band are dependent on a pathloss or distance between the UE 400 and the BS.

In some instances, the FD communication module 408 is configured to receive reference signals from the BS, transmit reference signals to the BS, estimate a pathloss or distance between the UE 400 and the BS based on received reference signals, report the pathloss or distance estimate, receive a transmit power control command from the BS, configure the transceiver 310 based on the transmit power control command. In some instances, the FD communication module 408 is configured to perform interference cancellation, for example, by coordinating with the transceiver 410. Mechanisms for SFFD communications and offset-frequency FD communications with a BS are described in greater detail herein.

As shown, the transceiver 410 may include the modem subsystem 412 and the RF unit 414. The modem subsystem 412 may be similar to the baseband portion of the UE 200 shown in FIG. 2. The RF unit 414 may be substantially similar to the transmit chains 220 and the receive chains 230 of the UE 200. The transceiver 410 can be configured to communicate bi-directionally with other devices, such as the UEs 115 and/or 300 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/ encoded data (e.g., PUSCH, PUCCH, reference signals for pathloss measurement, and/or pathloss and/or distance estimates) from the modem subsystem 412 (on outbound transmissions) or of transmissions originating from another source such as a UE 115, a BS 105, or a BS 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 300 according to some aspects of the present disclosure. The antennas 416 may further receive data messages transmitted from other devices and provide the received data messages for processing and/or demodulation at the transceiver 410. The transceiver 410 may provide the demodulated and decoded data (e.g., PDSCH, PDCCH, transmit-receive frequency band allocation for SFFD or offset-frequency FD communication) to the FD communication module 408 for processing. The antennas 416 may include multiple antennas of similar or different designs in order to sustain multiple transmission links.

In an aspect, the transceiver 410 is configured to transmit data to the BS over a first frequency band while receiving second data from the BS over the first frequency band responsive to a pathloss between the BS and the UE satisfying a threshold for an SFFD operation, for example, by coordinating with the FD communication module 408. In an aspect, the transceiver 410 is configured to transmit data to the BS over a second frequency band while receiving data from the BS over a third frequency band that is distinct from the second frequency band according to an offset-frequency FD operation, for example, by coordinating with the FD communication module 408.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

FIGS. 5A-5C, 6A-6C, and 7A-7C illustrate various mechanisms for operating a cell in a hybrid mode where UEs (e.g., the UEs 115 and 300) at a central region of the cell may communicate with a BS using SFFD and UEs at a cell edge or cell periphery may communicate with a BS using offset-frequency FD. In FIGS. 5A, 6A, and/or 7A, the cells 500, 600, and/or 700 may correspond to a portion of the network 100. Additionally, in FIGS. 5B-5C, 6B-6C, and 7B-7C, the x-axes may represent frequency some arbitrary units, and the y-axes may represent power in some arbitrary units.

FIG. 5A illustrates a hybrid cell 500 having users segregated into a central SFFD portion and an outer offset-frequency FD portion according to some aspects of the present disclosure. The cell 500 includes a central region 530 and a peripheral region 532. FIG. 5B illustrates a transmit/receive frequency band allocation for an SFFD user according to some aspects of the present disclosure. FIG. 5C illustrates a transmit/receive frequency band allocation for an offset-frequency FD user according to some aspects of the present disclosure. FIG. 5A illustrates one BS 505 serving one UE 515a in the central region 530 and one UE 515b in the peripheral region 532 for purposes of simplicity of discussion, though it will be recognized that embodiments of the present disclosure may scale to any suitable number of UEs in the central region 530 (e.g., 2, 3, 4, or 5 or more) and any suitable number of UEs in the peripheral region 532 (e.g., 2, 3, 4, or 5 or more). The BS 505 is similar to the BS s 105 and/or 300. The UEs 515 are similar to the UEs 115 and/or 400.

In the central region 530 of the cell 500, each UE may communicate with the BS 505 using an SFFD mode. In this regard, the UE may use the same frequency band for transmission and reception simultaneously. As shown in FIG. 5B, the BS 505 allocates a single, same UL/DL frequency band 554 within an allocated carrier-bandwidth 502 to the UE 515a located at the central region 530 of the cell 500 for SFDD communication over the communication link 520a. In other words, the BS 505 may allocate the same group of resource blocks occupying the frequency band 554 for the UE 515a to transmit and receive. Accordingly, the UE 515a's may simultaneously transmit in the frequency band 554 (shown by the transmit (Tx) spectrum 550 in solid line) and receive in the frequency band 554 (shown by the receive (Rx) spectrum 552 in dotted line). The carrier-bandwidth 502 may be located at any suitable frequency and may occupy any suitable amount of frequency. The carrier-bandwidth 502 may refer to the available channel bandwidth at an RF carrier. In some instance, the carrier-bandwidth 502 may be at a mmWav frequency and may occupy about 800 megahertz (MHz), 1 gigahertz (GHz) or more. In an example, the carrier-bandwidth 502 available to be shared by UEs in the central region 530 may be about 800 MHz wide. Each SFFD UE (e.g., the UE 515a) may be assigned its own 100 MHz slot within the 800 MHz bandwidth. The transmission band and receive band for an SFFD UE would thus be the same 100 MHz slot assigned to the SFFD UE.

A UE in the peripheral region 532 of cell 500 may use a high power amplification (in the transmit and receive paths) to communicate with the BS 505 due to the high path-loss. The high power amplification levels may introduce too much distortion for SFFD operation. As such, UEs in the cell edge or peripheral region 532 may communicate with the BS 505 using offset-frequency FD. In this regard, a cell-edge UE may transmit and receive using different frequency bands. As shown in FIG. 5C, the BS 505 allocates a transmit frequency band 544 and a separate receive frequency band 546 in the carrier-bandwidth 502 to the UE 515b located in the peripheral region 532 of the cell 500 for offset-frequency FD communication over the communication link 520b. In other words, the BS 505 may allocate a first group of resource blocks occupying the frequency band 544 and a separate second group of resource blocks occupying the frequency band 546 for the UE 515b to transmit and receive, respectively. Accordingly, the UE 515b's may simultaneously transmit in the frequency band 544 (shown by the transmit (Tx) spectrum 540 in solid line) and receive in the separate frequency band 546 (shown by the receive (Rx) spectrum 542 in dotted line). As can be observed, the UE 515b's receive operates at a first sidelobe 547 of the UE 515b's transmit. The shifting or offsetting the UE 515b's receive to operate in the first sidelobe 547 of the transmit can provide about 26 dB of isolation between the transmit and receive. Accordingly, each UE 515 in the cell 500 is configured for hybrid operation that is either SFFD or offset-frequency FD depending upon its power amplification levels and the pathlosses between the UE and the BS 505.

The frequency bands 544, 546, and 554 can be located in any suitable frequency. In some instances, the cell 500 is a 5G cell and the frequency bands 544, 546, and 554 may include sub-6 GHz bands and/or mmWave bands.

In some aspects, the same data rate may be applied to UEs across the cell 500. In this regard, offset-frequency FD UEs at the peripheral region 532 are allocated with transmit and receive bands having the same bandwidth as the shared band for the SFFD UEs at the central region 530. For example, if each SFFD UE is assigned its own 100 MHz band that is shared for transmission and reception, then the transmit and receive bands for the offset-frequency FD UEs would each be 100 MHz to provide the same data rate (assuming the modulation and coding provides for such equality). In the illustrated example of FIGS. 5B and 5C, the BS 505 may allocate 100 MHz for the single frequency band 554 assigned to the SFFD UE 515a for transmit and receive and may allocate 100 MHz for each frequency band 544 and 546 assigned to the offset-frequency FD UE 515b for transmit and receive, respectively.

Alternatively, the data rates and/or bandwidths may be different for UEs in the region 530 and UEs in the region 532. In this regard, UEs located at the central region 530 may be allocated with a wider bandwidth for a higher throughput or data rate than UEs located at the peripheral region 532. For instance, the BS 505 may allocate 400 MHz for the single frequency band 554 assigned to the SFFD UE 515a and may allocate 100 MHz for each frequency band 544 and 546 assigned to the offset-frequency FD UE 515b for transmit and receive, respectively.

While FIG. 5 illustrates the separate transmit and receive frequency bands for offset-frequency FD operation to be contiguous in frequency, the separate transmit and receive frequency bands can be offset or spaced apart from each other as shown in FIGS. 6 and 7 below.

FIG. 6A illustrates a hybrid cell 600 having users segregated into a central SFFD portion and an outer offset-frequency FD portion according to some aspects of the present disclosure. FIG. 6B illustrates a transmit/receive frequency band allocation for an SFFD user according to some aspects of the present disclosure. FIG. 6C illustrates a transmit/receive frequency band allocation for an offset-frequency FD user according to some aspects of the present disclosure. Generally speaking, the cell 600 includes features similar to cell 500 of FIG. 5 in many respects. For instance, the cell 600 includes a central region 630 and a peripheral region 632, where a BS 605 may configure a UE 615a located at the central region 630 for SFFD communication and may configure a UE 615b located at the peripheral region for offset SFFD communication. The BS 605 is similar to the BSs 105, 300, and/or 505. The UEs 615 are similar to the UEs 115, 200, 400, and/or 515. As shown in FIG. 6B, the BS 605 allocates a single frequency band 654 in a carrier-bandwidth 602 (e.g., the carrier-bandwidth 502) to the UE 615a located at the central region 630 for SFDD communication over the communication link 620a. The BS 605 may allocate the same group of resource blocks occupying the frequency band 654 for the UE to transmit and receive. The UE 615a may simultaneously transmit in the frequency band 654 (shown by the transmit spectrum 650 in solid line) and receive in the frequency band 654 (shown by the receive spectrum 652 in dotted line).

However, in the cell 600, each UE located at the peripheral region 632 is assigned with a transmit band spaced apart from a receive band by one or more bands for offset-frequency FD. In other words, offset-frequency FD UEs are assigned with transmit and receive bands that are non-contiguous in frequency. As shown in FIG. 6C, the BS 605 allocates a transmit frequency band 644 and a separate receive frequency band 646 to the UE 615b located in the peripheral region 632 for offset-frequency FD communication over the communication link 620b, where the transmit frequency band 644 is spaced apart from the receive frequency band 646 by a frequency separation 648. In other words, the BS 605 may allocate a group of resource blocks occupying the frequency band 644 and a group of resource blocks occupying the frequency band 646 for the UE 615b to transmit and receive, respectively. The UE 615b may simultaneously transmit in the frequency band 644 (shown by the transmit (Tx) spectrum 640 in solid line) and receive in the separate frequency band 646 (shown by the receive (Rx) spectrum 642 in dotted line). As can be observed, the UE 615b's receive operates at a second sidelobe 649 of the UE 615b's transmit. The frequency separation 648 allows the UE 615b's receive to operate in the second sidelobe 649 of the transmit rather than the first sidelobe 647 of the transmit as in FIG. 5C. Thus, the frequency separation 648 can provide additional rejection (e.g., >26 dB) between the transmit and receive channels. In general, the higher the frequency separation 648 between the transmit band 644 and the receive band 646, the lower the transmit emission into the receiver.

In some aspects, SFFD UEs located at the central region 630 may be allocated with a wider bandwidth for a higher data rate than offset-frequency FD UEs located at the peripheral region 632. Additionally, the frequency separation between the transmit and receive bands assigned to an offset-frequency FD UE may be based on the pathloss and/or distance between the offset-frequency FD UE and the BS. For instance, the BS 605 may allocate about 400 MHz for the single frequency band 654 assigned to the SFFD UE 615a and may allocate 100 MHz for each frequency band 644 and 646 assigned to the offset-frequency FD UE 615b for transmit and receive, respectively. The BS 605 may determine the frequency separation 648 based on the pathloss between the UE 615b and the BS 605.

In some aspects, the BS 605 may determine a distance between the UE 615b and the BS 605 based on pathloss measurement for the UE 615b. The BS 605 may store a look-up-table (LUT), for example, in a memory such as the memory 304, that maps frequency separations to distances. As the distance increases, the interference from the transmit to the receive may increase. Thus, in some instances, the frequency separation may increase as the distance increases to provide better rejection between the transmit and receive channels. For instance, the BS 605 may obtain an estimate of a distance between the UE 615b and the BS 605. The BS 605 may determine a frequency separation 648 for transmit and receive frequency band allocation for the UE 615b based on the LUT.

FIG. 7A illustrates a hybrid cell 700 having users segregated into a central SFFD portion and an outer offset-frequency FD portion according to some aspects of the present disclosure. FIG. 7B illustrates a transmit/receive frequency band allocation for an SFFD user according to some aspects of the present disclosure. FIG. 7C illustrates transmit/receive frequency band allocation for an offset-frequency FD user according to some aspects of the present disclosure. Generally speaking, the cell 700 includes features similar to cell 500 of FIG. 5 and the cell 600 of FIG. 6 in many respects. For instance, the cell 700 includes a central region 730 and a peripheral region 732, where a BS 705 may configure a UE 715a located at the central region 730 for SFFD communication and may configure a UE 715b and a UE 715c located at the peripheral region for offset SFFD communication. The BS 705 is similar to the BSs 105, 300, 505, and/or 605. The UEs 715 are similar to the UEs 115, 200, 400, 515, and/or 615. As shown in FIG. 7B, the BS 705 allocates a single frequency band 754 in an allocated carrier-bandwidth 702 (e.g., the carrier-bandwidths 502 and 602) to the UE 715a located at the central region 730 for SFDD communication over the communication link 720a. The UE 715a may simultaneously transmit in the frequency band 754 (shown by the transmit spectrum 750 in solid line) and receive in the frequency band 754 (shown by the receive spectrum 752 in dotted line).

Further, similar to the cell 600, each UE located at the peripheral region 632 is assigned with a transmit band spaced apart from a receive band by one or more bands for offset-frequency FD. However, in the cell 700, an offset-frequency FD UE at the peripheral region 732 may be assigned with transmit and receive bands that are separated by a transmit band or a receive band of another offset-frequency FD UE at the peripheral region 732. As shown in FIG. 7C, the BS 705 allocates a transmit frequency band 744 and a separate receive frequency band 746 to the UE 715b located in the peripheral region 732 for offset-frequency FD communication over the communication link 720b. In other words, the BS 705 may allocate a group of resource blocks occupying the frequency band 744 and another group of resource blocks occupying the frequency band 746 for the UE 715b to transmit and receive, respectively. The BS 705 further allocates a transmit frequency band 764 and a separate receive frequency band 766 to the UE 715 located in the peripheral region 732 for offset-frequency FD communication over the communication link 720c. In other words, the BS 605 may allocate a group of resource blocks occupying the frequency band 764 and another group of resource blocks occupying the frequency band 766 for the UE 615c to transmit and receive, respectively. The allocation to the UE 715b interleaves with the allocation to the UE 715c such that the transmit frequency bands 744 and the receive frequency band 746 of the UE 715b are spaced apart by the transmit frequency band 764 of the UE 715c. The UE 715b may simultaneously transmit in the frequency band 744 (shown by the transmit (Tx) spectrum 740 in solid line) and receive in the separate frequency band 746 (shown by the receive (Rx) spectrum 742 in solid line). The UE 715c may simultaneously transmit in the frequency band 764 (shown by the transmit (Tx) spectrum 740 in dotted line) and receive in the separate frequency band 766 (shown by the receive (Rx) spectrum 762 in dotted line). The simultaneous transmission and reception of the UE 715b may occur at the same time as the simultaneous transmission and reception of the UE 715c.

Depending on the separation between the UE 715b and the UE 715c in the peripheral region 732, the amount of transmit signal from the UE 715c leaked into the receive band 746 of the UE 715b may be minimal. For instance, when the UE 715c is about one meter away from the UE 715b, the transmit noise from the UE 715c leaked into the receive band 746 of the UE 715b may be attenuated by about 60 dB.

In some aspects, the UE 715b and/or the UE 715c may utilize an analog baseband filter at the receiver (e.g., the receive chain 230) prior to an ADC (e.g., the ADC 232) to reject the transmit signal of the UE 715b and/or the transmit signal of the nearby UE 715c that are leaked into the UE 715b's receiver. The analog baseband filter at the UE 715b's receiver may have a filter with a frequency response 770 as shown in FIG. 7B. Similar analog baseband filter may also be used by the UE 515 of FIG. 5 with the contiguous transmit/receive allocation and/or the UE 615 of FIG. 6 with the spaced apart transmit/receive allocation.

In some aspects, a BS (e.g., the BSs 105, 300, 505, 605, and/or 705) may utilize SFFD for communications with UEs (e.g., the UEs 115, 200, 515*a*, 615*a*, and/or 715*a*) located in a central region (e.g., the central region 530, 630, and/or 730) of a cell (e.g., the cells 500, 600, and/or 700) up to a periphery of the cell. The BS may utilize offset-frequency FD for communications with UEs located at a cell edge (e.g., the outer peripheral region 532, 632, and/or 732) by allocated separate transmit and receive bands for the UEs, where the separate transmit and receive bands may be contiguous in frequency as shown in FIG. 5C, spaced apart in frequency as shown in FIG. 6C, and/or interleaved with another UE's transmit and/or receive band as shown in FIG. 7C. The BS may select between the SFFD and the offset-frequency FD based on a pathloss between the BS and a corresponding UE. For instance, the BS may configure a UE in a cell range that can achieve about 95 dB transmit-receive isolation for SFFD and may configure a UE in at a cell edge with consecutive transmit-receive band allocation or spaced apart transmit-receive band allocation to achieve 95 dB or more transmit-receive isolation.

Figure 8:
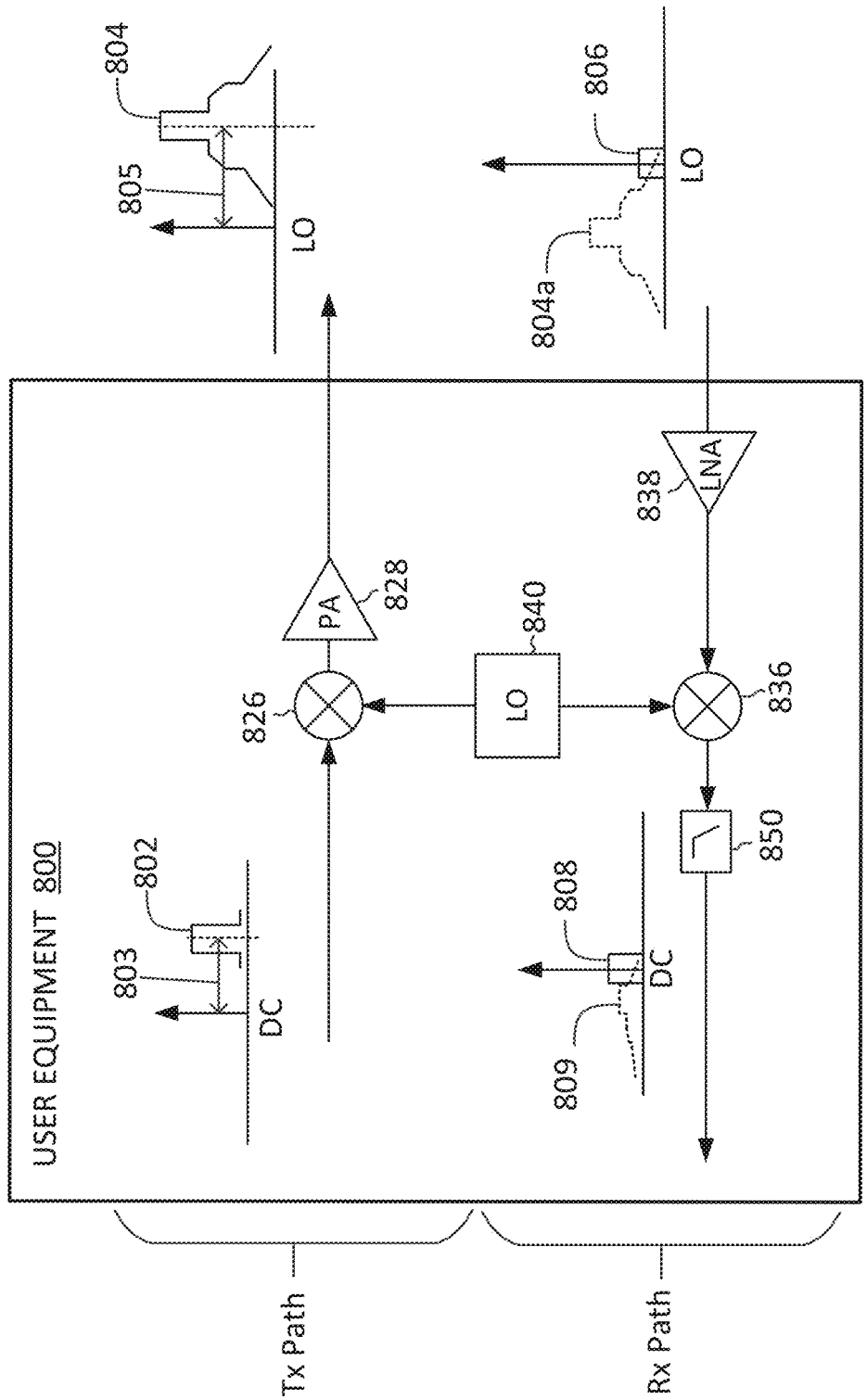
FIG. 8 illustrates transmit/receive paths of a UE operating in an offset-frequency FD mode according to some aspects of the present disclosure.

Regardless of whether the transmit and receive bands are contiguous or separated, an advantageous frequency offset at baseband may be used in an UE operating with SFFD. FIG. 8 illustrates transmit/receive paths of a UE 800 operating in an offset-frequency FD mode according to some aspects of the present disclosure. The UE 800 may correspond to a UE 115 in the network 100, the cell-edge UE 515*b* in the cell 500, the cell-edge UE 615*b* in the cell 600, the cell-edge UE 715*b* or 715*c* in the cell 700. The UE 800 may have a substantial similar baseband portion and/or transmit/receive chains as the UE 200. FIG. 8 illustrates a portion of the analog transmit/receive paths of the UE 800. Additionally, FIG. 8 illustrates a receiver configuration that combines an offset transmit modulation with a zero-intermediate frequency (IF) receive conversion to enable the use of a single LO for direct RF to direct-current (DC) conversion in the receive path.

The UE 800 includes a mixer 826 coupled to a PA 828 in the transmit path, a mixer 836 coupled to a LNA 838 in the receive path, a LO 840 coupled to the mixer 826 and the mixer 836, and an analog baseband lowpass filter 850 coupled to the mixer 836. The mixer 826, the PA 828, the mixer 836, the LNA 838, and the LO 840 may be substantially similar to the mixer 226, the PA 228, the mixer 236, the LNA 238, and the LOs 224 and 234 of the UE 200 shown in FIG. 2, respectively.

As shown in FIG. 8, the analog baseband signal 802 for the transmit path is offset in frequency from the baseband DC frequency by an offset 803 (e.g., about 100 MHz). After mixing with the LO 840 by the mixer 826 and amplification by the PA 828, the transmit band for the transmitted RF signal 804 is thus 100 MHz higher than the LO frequency as shown by the offset 805. In contrast, the receive band 806 is centered about the LO due to the frequency offset between the transmit and receive bands. The transmitted RF signal 804 that is coupled to the receive path at the input to the LNA 838 is shown as 804*a*. After amplification by the LNA 838 and mixing with the LO 840 by the mixer 836 for a downconversion, the received signal 808 at the baseband will thus be centered around the baseband DC frequency whereas the leakage from the transmitted signal (shown as 809) into the received signal 808 at the baseband is greater than DC by the 100 MHz offset. The leakage is thus readily filtered by the lowpass filter 850.

Figure 9:
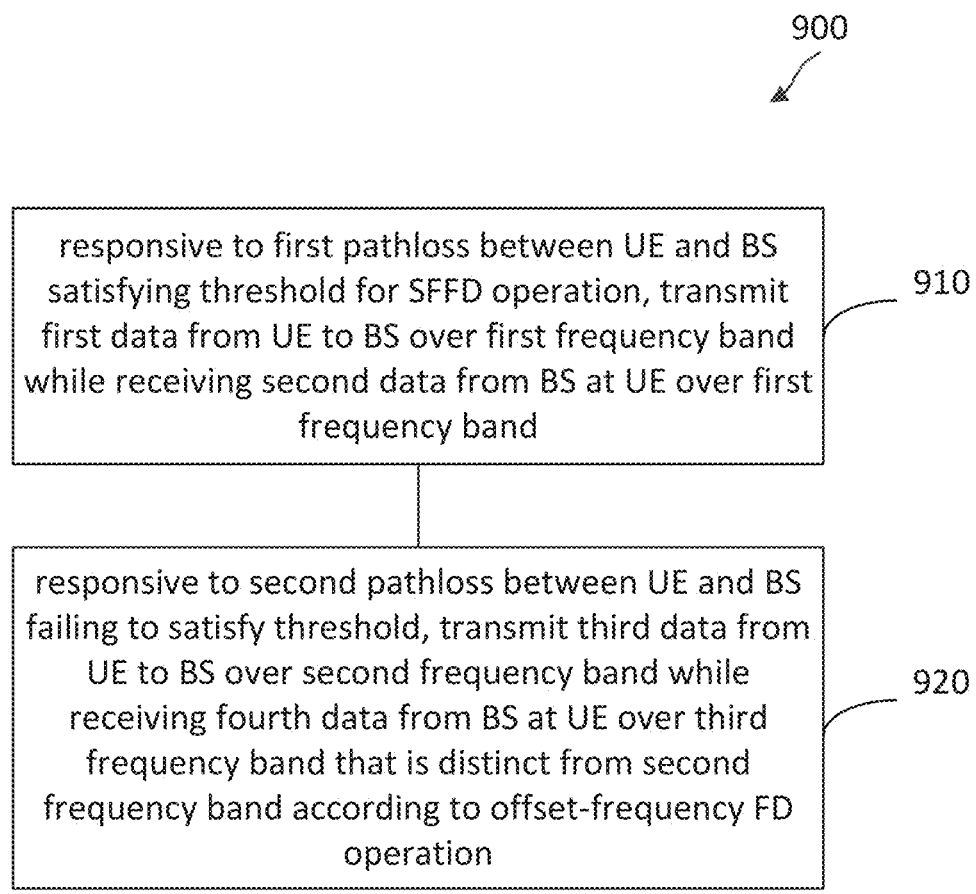
FIG. 9 is a flow diagram of a communication method according to some aspects of the present disclosure.

FIG. 9 is a flow diagram of a communication method 900 according to some aspects of the present disclosure. Blocks of the method 900 can be executed by a computing device (e.g., a processor, processing circuit, and/or other suitable component) of a wireless communication device or other suitable means for performing the blocks. For example, a wireless communication device, such as the UEs 115, 200, 400, 515, 615, 715, and/or 800, may utilize one or more components, such as the processor 402, the memory 404, the FD communication module 408, the transceiver 410, the modem 412, and the one or more antennas 416, to execute the blocks of method 900. The method 900 may employ similar SFFD and offset-frequency FD allocation mechanisms discussed above with respect to FIGS. 2 and 5-8. As illustrated, the method 900 includes a number of enumerated blocks, but aspects of the method 900 may include additional blocks before, after, and in between the enumerated blocks. In some aspects, one or more of the enumerated blocks may be omitted or performed in a different order.

At block 910, responsive to a first pathloss between a UE and a BS satisfying a threshold for an SFFD operation, the UE transmits first data to the BS over a first frequency band while receiving second data from the BS over the first frequency band. The UE may be similar to the UEs 115, 200, 400, 515, 615, 715, and/or 800. The BS may be similar to the BSs 105, 300, 505, 605, and/or 705. In some instances, the UE may utilize one or more components, such as the processor 402, the FD communication module 408, the transceiver 410, the modem 412, and the one or more antennas 416, to transmit the first data to the BS over the first frequency band while receiving the second data from the BS over the first frequency band. The UE may transmit the first data to the BS using a group of resource blocks occupying the first frequency band in a carrier-bandwidth (e.g., the carrier-bandwidths 502, 602, and/or 702) while receiving the second data from the BS in the same group of resource blocks occupying the first frequency band.

At block 920, responsive to a second pathloss between the UE and the BS failing to satisfy the threshold, the UE transmits third data to the BS over a second frequency band while receiving fourth data from the BS over a third frequency band that is distinct from the second frequency band according to an offset-frequency FD operation. In some instances, the UE may utilize one or more components, such as the processor 402, the FD communication module 408, the transceiver 410, the modem 412, and the one or more antennas 416, to transmit the third data to the BS over the second frequency band while receiving the fourth data from the BS over the third frequency band. The UE may transmit the third data to the BS using a group of resource blocks occupying the second frequency band in the carrier-bandwidth while receiving the fourth data from the BS in a group of resource blocks occupying the third frequency band in the carrier-bandwidth.

In some instances, the first frequency band, the second frequency band, and the third frequency band each have the same bandwidth. For example, each of the first, second, and third frequency band may have a bandwidth of about 100 MHz, 200 MHz, or 400 MHz.

In some instances, the first frequency band have a different bandwidth than at least one of the second frequency band or the third frequency band. For example, the first frequency band may have a bandwidth of about 400 MHz and the second and third frequency band may each have a frequency of about 100 MHz.

In some instances, the second frequency band and the third frequency band are contiguous in frequency. For example, the first frequency band may correspond to the frequency band 554, the second frequency band may correspond to the frequency band 544, and the third frequency band may correspond to the frequency band 546 as shown in FIG. 5.

In some instances, the second frequency band and the third frequency band are spaced apart by a frequency separation. For example, the first frequency band may correspond to the frequency band 654, the second frequency band may correspond to the frequency band 644, and the first frequency band may correspond to the frequency band 646 as shown in FIG. 6. Alternatively, the first frequency band may correspond to the frequency band 754, the second frequency band may correspond to the frequency band 744, and the first frequency band may correspond to the frequency band 746 as shown in FIG. 7. In some instances, the frequency separation between the second frequency band and the third frequency band is based on the second pathloss.

In some instances, the block 920 includes modulating, by a LO at the UE, the third data at an offset from a DC frequency to produce a RF signal in the second frequency band and downconverting, by the LO at the UE, a RF signal carrying the fourth data in the third frequency band to the DC frequency. In some instances, the UE may utilize the configuration shown in FIG. 8 where a single LO 840 used for the offset transmit modulation and the zero IF receive conversion.

In some instances, the UE may receive an allocation for the SFFD operation when the UE is located at a central region (e.g., the central regions 530, 630, and/or 730) of a cell (e.g., the cells 500, 600, and/or 700) served by the BS. The UE may receive an allocation for the offset-frequency FD operation when the UE travels to a periphery of the cell (e.g., in the peripheral regions 532, 632, and/or 732).

In some instances, the first, second, and third frequency bands may be mmWave bands.

Figure 10:
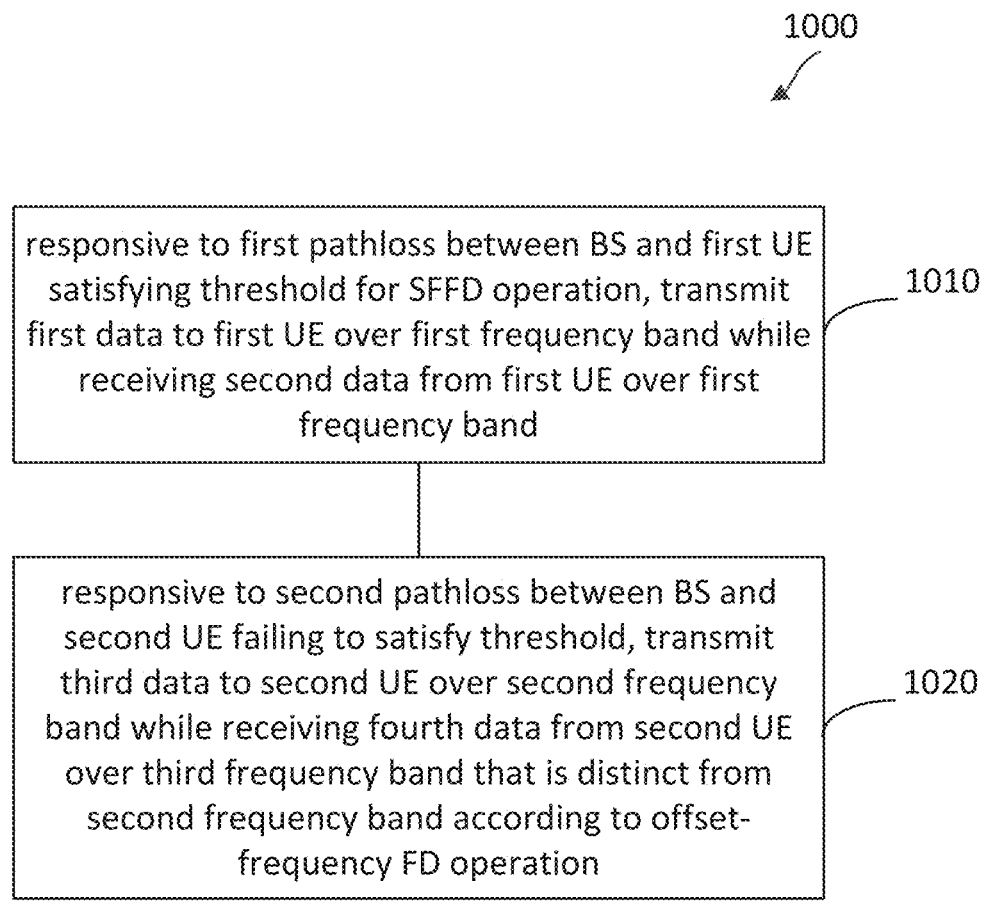
FIG. 10 is a flow diagram of a communication method according to some aspects of the present disclosure.

FIG. 10 is a flow diagram of a communication method 1000 according to some aspects of the present disclosure. Blocks of the method 1000 can be executed by a computing device (e.g., a processor, processing circuit, and/or other suitable component) of a wireless communication device or other suitable means for performing the blocks. For example, a wireless communication device, such as the BSs 105, 300, 505, 605, and/or 705, may utilize one or more components, such as the processor 302, the memory 304, the FD communication module 308, the transceiver 310, the modem 312, and the one or more antennas 316, to execute the blocks of method 1000. The method 1000 may employ similar SFFD and offset-frequency FD allocation mechanisms discussed above with respect to FIGS. 2 and 5-7. As illustrated, the method 1000 includes a number of enumerated blocks, but aspects of the method 1000 may include additional blocks before, after, and in between the enumerated blocks. In some aspects, one or more of the enumerated blocks may be omitted or performed in a different order.

At block 1010, responsive to a first pathloss between a BS and a first UE satisfying a threshold for an SFFD operation, the BS transmits first data to the UE over a first frequency band while receiving second data from the UE over the first frequency band. The first UE may be similar to the UEs 115, 200, 400, 515, 615, 715, and/or 800. The BS may be similar to the BSs 105, 300, 505, 605, and/or 705. In some instances, the BS may utilize one or more components, such as the processor 302, the FD communication module 308, the transceiver 310, the modem 312, and the one or more antennas 316, to transmit the first data to the UE over the first frequency band while receiving the second data from the UE over the first frequency band. The BS may transmit the first data to the UE using a group of resource blocks occupying the first frequency band in a carrier-bandwidth (e.g., the carrier-bandwidths 502, 602, and/or 702) while receiving the second data from the UE in the same group of resource blocks occupying the first frequency band.

At block 1020, responsive to a second pathloss between the BS and a second UE failing to satisfy the threshold, the BS transmits third data to the second UE over a second frequency band while receiving fourth data from the second UE at the BS over a third frequency band that is distinct from the second frequency band according to an offset-frequency FD operation. The second UE may be similar to the UEs 115, 200, 400, 515, 615, 715, and/or 800. In some instances, the BS may utilize one or more components, such as the processor 302, the FD communication module 308, the transceiver 310, the modem 312, and the one or more antennas 316, to transmit the third data to the second UE over the second frequency band while receiving the fourth data from the second UE over the third frequency band. The BS may transmit the third data to the UE using a group of resource blocks occupying the second frequency band in the carrier-bandwidth while receiving the fourth data from the UE in a group of resource blocks occupying the third frequency band in the carrier-bandwidth.

In some instances, the first frequency band, the second frequency band, and the third frequency band each have the same bandwidth. For example, each of the first, second, and third frequency band may have a bandwidth of about 100 MHz, 200 MHz, or 400 MHz.

In some instances, the first frequency band have a different bandwidth than at least one of the second frequency band or the third frequency band. For example, the first frequency band may have a bandwidth of about 400 MHz and the second and third frequency band may each have a frequency of about 100 MHz.

In some instances, the second frequency band and the third frequency band are contiguous in frequency. For example, the first frequency band may correspond to the frequency band 554, the second frequency band may correspond to the frequency band 544, and the first frequency band may correspond to the frequency band 546 as shown in FIG. 5.

In some instances, the second frequency band and the third frequency band are spaced apart by a frequency separation. For example, the first frequency band may correspond to the frequency band 654, the second frequency band may correspond to the frequency band 644, and the first frequency band may correspond to the frequency band 646 as shown in FIG. 6. Alternatively, the first frequency band may correspond to the frequency band 754, the second frequency band may correspond to the frequency band 744, and the first frequency band may correspond to the frequency band 746 as shown in FIG. 7. In some instances, the frequency separation between the second frequency band and the third frequency band is based on the second pathloss. In some instances, the method 1000 includes determining, by the BS, the frequency separation between the second frequency band and the third frequency band based on the second pathloss. In some instances, the BS may utilize one or more components, such as the processor 302, the FD communication module 308, and/or the memory 304, to determine the frequency separation for the allocation of the second and third frequency band based on the second pathloss. For instance, the BS may store a LUT in the memory, where the LUT may include a mapping between distance or pathloss to frequency separation. The BS may utilize the processor to perform the table lookup based on the second pathloss or a distance estimated from the second pathloss.

In some instances, the method 1000 further includes responsive to a third pathloss between the BS and a third UE failing to satisfy the threshold, transmitting fifth data from the BS to the third UE over a fourth frequency band while receiving sixth data from the third UE at the BS over a fifth frequency band that is distinct from the fourth frequency band, where the second frequency band and the third frequency band are spaced apart by at least one of the fourth frequency band or the fifth frequency band. In some instances, the BS may utilize one or more components, such as the processor 302, the FD communication module 308, the transceiver 310, the modem 312, and the one or more antennas 316, to transmit the fifth data to the third UE over the fourth frequency band while receiving the sixth data from the second UE over the fifth frequency band.

In some instances, the method 1000 further includes transmitting, by the BS to the first UE, an allocation indicating the first frequency band for the SFFD operation based on a comparison between the first pathloss and the threshold. The method 1000 further includes transmitting, by the BS to the second UE, an allocation indicating the second frequency band and the third frequency band for the offset-frequency FD operation. In some instances, the BS may utilize one or more components, such as the processor 302, the FD communication module 308, the transceiver 310, the modem 312, and the one or more antennas 316, to transmit the allocation indicating the first frequency band for the SFFD operation to the first UE based on a comparison between the first pathloss and the threshold and the allocation indicating the second and third frequency bands for the offset-frequency FD operation to the second UE based on a comparison between the second pathloss and the threshold.

In some instances, the first UE and the second UE may correspond to the same UE. The BS may assign the SFFD operation when the UE is located at a central region (e.g., the central regions 530, 630, and/or 730) of a cell (e.g., the cells 500, 600, and/or 700) served by the BS. The BS assign the offset-frequency FD operation when the UE travels to a periphery of the cell (e.g., in the peripheral regions 532, 632, and/or 732).

In some instances, the first, second, and third frequency bands may be mmWave bands.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method performed by a user equipment (UE), the method comprising:
   receiving, from a network entity, a first allocation indicating a carrier bandwidth;
   responsive to a first pathloss between the UE and the network entity satisfying a threshold for a same-frequency full-duplex (SFFD) operation, simultaneously transmitting first data to the network entity over a first frequency band and receiving second data from the network entity over the first frequency band based on the first allocation indicating the carrier bandwidth, wherein the first frequency band is within the carrier bandwidth;
   receiving, from the network entity based on a second pathloss between the UE and the network entity failing to satisfy the threshold, a second allocation indicating a second frequency band for uplink (UL) communications and a third frequency band for downlink (DL) communications, wherein the second allocation is based on the first allocation such that the second frequency band and the third frequency band are within the carrier bandwidth of the first allocation;
   switching, based on the second allocation, to an offset-frequency full-duplex (FD) operation;
   transmitting, based on the offset-frequency FD operation and the second allocation, third data to the network entity over the second frequency band; and
   receiving, simultaneously with transmitting the third data and based on the offset-frequency FD operation and the second allocation, fourth data from the network entity over the third frequency band, wherein the third frequency band is distinct from the second frequency band, wherein the second frequency band and the third frequency band are spaced apart by at least one of a fourth frequency band or a fifth frequency band, and wherein the fourth frequency band and the fifth frequency band are allocated to a second UE for the offset-frequency FD operation based on a third pathloss between the network entity and the second UE failing to satisfy the threshold.

2. The method of claim 1, wherein the first frequency band, the second frequency band, and the third frequency band each have the same bandwidth.

3. The method of claim 1, wherein the first frequency band has a different bandwidth than at least one of the second frequency band or the third frequency band.

4. The method of claim 1, wherein a frequency separation defined between the second frequency band and the third frequency band is based on the second pathloss.

5. The method of claim 1, wherein transmitting the third data from the UE to the network entity over the second frequency band while receiving the fourth data from the network entity at the UE over the third frequency band comprises:
  modulating, by a local oscillator (LO) at the UE, the third data at an offset from a direct current (DC) frequency to produce a radio frequency (RF) signal in the second frequency band; and
  downconverting, by the LO at the UE, a RF signal carrying the fourth data in the third frequency band to the DC frequency.

6. The method of claim 1, wherein a bandwidth of the first frequency band is larger than a bandwidth of each of the second frequency band and the third frequency band.

7. A method performed by a network entity, the method comprising:
  transmitting, to a user equipment (UE), a first allocation indicating a carrier bandwidth;
  responsive to a first pathloss between the network entity and the UE satisfying a threshold for a same-frequency full-duplex (SFFD) operation, simultaneously transmitting first data to the UE over a first frequency band and receiving second data from the UE over the first frequency band based on the first allocation indicating the carrier bandwidth, wherein the first frequency band is within the carrier bandwidth;
  transmitting, to the UE based on a second pathloss between the network entity and the UE failing to satisfy the threshold, a second allocation indicating a second frequency band for downlink (DL) communications and a third frequency band for uplink (UL) communications, wherein the second allocation is based on the first allocation such that the second frequency band and third frequency band are within the carrier bandwidth of the first allocation;
  switching, based on the second allocation, to an offset-frequency full-duplex (FD) operation;
  transmitting, based on the offset-frequency FD operation and the second allocation, third data to the UE over the second frequency band; and
  receiving, simultaneously with transmitting the third data and based on the offset-frequency FD operation and the second allocation, fourth data from the UE over the third frequency band, wherein the third frequency band is distinct from the second frequency band wherein the second frequency band and the third frequency band are spaced apart by at least one of a fourth frequency band or a fifth frequency band, and wherein the fourth frequency band and the fifth frequency band are allocated to a second UE for the offset-frequency FD operation based on a third pathloss between the network entity and the second UE failing to satisfy the threshold.

8. The method of claim 7, wherein the first frequency band, the second frequency band, and the third frequency band each have the same bandwidth.

9. The method of claim 7, wherein the first frequency band comprises a different bandwidth than at least one of the second frequency band or the third frequency band.

10. The method of claim 7, further comprising:
  determining, by the network entity, a frequency separation between the second frequency band and the third frequency band based on the second pathloss.

11. The method of claim 7, further comprising:
  responsive to the third pathloss between the network entity and the second UE failing to satisfy the threshold, transmitting fifth data from the network entity to the second UE over the fourth frequency band while receiving sixth data from the second UE at the network entity over the fifth frequency band.

12. The method of claim 7, wherein: the transmitting the first allocation is based on a comparison between the first pathloss and the threshold; and the transmitting the second allocation is based on a comparison between the second pathloss and the threshold.

13. The method of claim 7, wherein a bandwidth of the first frequency band is larger than a bandwidth of each of the second frequency band and the third frequency band.

14. A user equipment (UE) comprising:
  a transceiver configured to:
    receive, from a network entity, a first allocation indicating a carrier bandwidth;
    responsive to a first pathloss between the UE and the network entity satisfying a threshold for a same-frequency full-duplex (SFFD) operation, simultaneously transmit first data to the network entity over a first frequency band and receive second data from the network entity over the first frequency band based on the first allocation indicating the carrier bandwidth, wherein the first frequency band is within the carrier bandwidth;
    receive, from the network entity based on a second pathloss between the UE and the network entity failing to satisfy the threshold, a second allocation indicating a second frequency band for uplink (UL) communications and a third frequency band for downlink (DL) communications, wherein the second allocation is based on the first allocation such that the second frequency band and the third frequency band are within the carrier bandwidth of the first allocation;
    switch, based on the second allocation, to an offset-frequency full-duplex (FD) operation;
    transmit, based on the offset-frequency FD operation and the second allocation, third data to the network entity over the second frequency band; and
    receive, simultaneously with transmitting the third data and based on the offset-frequency FD operation and the second allocation, fourth data from the network entity over the third frequency band, wherein the third frequency band is distinct from the second frequency band, wherein the second frequency band and the third frequency band are spaced apart by at least one of a fourth frequency band or a fifth frequency band, and wherein the fourth frequency band and the fifth frequency band are allocated to a second UE for the offset-frequency FD operation based on a third pathloss between the network entity and the second UE failing to satisfy the threshold.

15. The UE of claim 14, wherein the first frequency band, the second frequency band, and the third frequency band each have the same bandwidth.

16. The UE of claim 14, wherein the first frequency band has a different bandwidth than at least one of the second frequency band or the third frequency band.

17. The UE of claim 14, wherein a frequency separation between the second frequency band and the third frequency band is based on the second pathloss.

18. The UE of claim 14, wherein:
the transceiver comprises a local oscillator (LO), a first mixer, and a second mixer; and
the transceiver configured to transmit the third data to the network entity over the second frequency band while receiving the fourth data from the network entity over the third frequency band is configured to:
modulate, via the LO and the first mixer, the third data at an offset from a direct current (DC) frequency to produce a radio frequency (RF) signal in the second frequency band; and
downconvert, via the LO and the second mixer, a RF signal carrying the fourth data in the third frequency band to the DC frequency.

19. The UE of claim 14, wherein a bandwidth of the first frequency band is larger than a bandwidth of each of the second frequency band and the third frequency band.

20. A network entity comprising:
a transceiver configured to:
transmit, to a user equipment (UE), a first allocation indicating a carrier bandwidth;
responsive to a first pathloss between the network entity and the UE satisfying a threshold for a same-frequency full-duplex (SFFD) operation, simultaneously transmit first data to the UE over a first frequency band and receive second data from the UE over the first frequency band based on the first allocation indicating the carrier bandwidth, wherein the first frequency band is within the carrier bandwidth;
transmit, to the UE based on a second pathloss between the network entity and the UE failing to satisfy the threshold, a second allocation indicating a second frequency band for downlink (DL) communications and a third frequency band for uplink (UL) communications, wherein the second allocation is based on the first allocation such that the second frequency band and third frequency band are within the carrier bandwidth of the first allocation;
switch, based on the second allocation, to an offset-frequency full-duplex (FD) operation;
transmit, based on the offset-frequency FD operation and the second allocation, third data to the UE over the second frequency band; and
receive, simultaneously with transmitting the third data and based on the offset-frequency FD operation and the second allocation, fourth data from the UE over the third frequency band, wherein the third frequency band is distinct from the second frequency band, wherein the second frequency band and the third frequency band are spaced apart by at least one of a fourth frequency band or a fifth frequency band, and wherein the fourth frequency band and the fifth frequency band are allocated to a second UE for the offset-frequency FD operation based on a third pathloss between the network entity and the second UE failing to satisfy the threshold.

21. The network entity of claim 20, wherein the first frequency band, the second frequency band, and the third frequency band each have the same bandwidth.

22. The network entity of claim 20, wherein the first frequency band comprises a different bandwidth than at least one of the second frequency band or the third frequency band.

23. The network entity of claim 20, further comprising:
a processor configured to determine a frequency separation between the second frequency band and the third frequency band based on the second pathloss.

24. The network entity of claim 20, wherein the transceiver is further configured to:
responsive to the third pathloss between the network entity and the second UE failing to satisfy the threshold, transmit fifth data to the second UE over the fourth frequency band while receiving sixth data from the second UE over the fifth frequency band.

25. The network entity of claim 20, wherein:
the first allocation is based on a comparison between the first pathloss and the threshold; and
the second allocation is based on a comparison between the second pathloss and the threshold.

26. The network entity of claim 20, wherein a bandwidth of the first frequency band is larger than a bandwidth of each of the second frequency band and the third frequency band.

\* \* \* \* \*